United States Patent Office 3,072,537
Patented Jan. 8, 1963

3,072,537
SURGICAL LUBRICATING CREAM
Albert Adam Stonehill, Plainfield, N.J., assignor to Ethicon, Inc., a corporation of New Jersey
No Drawing. Filed Mar. 31, 1960, Ser. No. 18,802
9 Claims. (Cl. 167—91)

This is a continuation-in-part of application Serial No. 722,692, filed March 20, 1958, now abandoned.

In recent years a considerable amount of evidence has been accumulated which indicates that the use of free-flowing powders as glove lubricants causes post-operative complications. It has been observed that powders such as for example, starch, have a tendency to spread throughout the operative area and to invade the immediate operative field. In doing so, they act as carriers for air-borne microorganisms which cause post-operative infections. Because of their mircoscopic size, they also increase the probability of such complications as pneumonia and adhesions.

It has now been discovered that these post-operative problems can be largely eliminated, or at least minimized to a considerable degree, by employing surgical lubricants in the form of sterile pharmaceutical creams. Preferably such creams are emulsions of an appropriate lubricating powder for example, starch or lycopodium containing a sufficient quantity of a pharmaceutically compatible, volatile, water-miscible organic solvent such as a lower alkanol for example, methyl alcohol, propyl alcohol, isopropyl alcohol or, preferably, ethyl alcohol, to effect a cream-like consistency. When such creams are applied to the hands, the organic solvent evaporates leaving a film of dry, sterile powder on the skin.

Many outstanding features are attributable to the present invention—among these being that it enables the packing of individual quantities of sterile surgical lubricating creams useful for lubricating the surgeon's hands prior to insertion in the surgical gloves. The composition of the present invention, as it relates to a starch cream, is especially advantageous in that it may be sterilized by autoclaving under standard hospital conditions. When applied to the hands and rubbed in it will disappear within thirty seconds. It leaves no greasy or tacky residue on the hands in contrast to other lubricating creams, nor does it give the skin a clammy or wet feeling.

The composition of the present invention comprises, in its broadest aspects, a solid powder normally used for lubrication such as for example, lycopodium or, preferably, starch emulsified in an aqueous alcoholic mixture. Advantageous for use in the composition of the present invention is ordinary starch or a modified starch which does not have a tendency to cake as for example, formaldehyde-treated starch or, preferably, epichlorohydrin-treated starch such as that described by Caldwell et al. in United States Patent 2,626,257.

The preferred emulsifying agent is a mixture of a suitable amine and a long-chain fatty acid. Includable in the latter group, and preferred for the purpose of this invention, is carboxyvinyl polymer, commonly known as Carbopol 934. If so desired, one may use for emulsification with the amine any one of a wide variety of other acids as for example, stearic acid, or any long-chain fatty acid containing from 8 to 36 carbon atoms for example, oleic, palmitic or ricinoleic. As the base for emulsification of the acid, one may use an organic or inorganic base capable of reacting with the acid to make a soap as for example, an alkali metal hydroxide such as sodium or potassium hydroxide or ammonium hydroxide. Among the amines suitable for this purpose are primary, secondary and tertiary amines as for example, triethanolamine, dodecylamine, stearyl amine, monoethanolamine, diisopropanolamine, triamylamine, monoamylamine and polyoxyethylenecocoamine having 15 carbon atoms in the ethylene chain (Ethomeen C-25). Also suitable as emulsifying agents are condensation products of ethylene oxide in sorbitan fatty acid esters for example monolaurate, monopalmitate or monostearate; or long-chain fatty acid partial esters of hexitol anhydride for example, sorbitans, sorbides, mannitans or mannides.

The volume of alcohol which is to be added to the starch emulsion depends largely upon the consistency one wants for the final preparation. For example, if a smooth cream is desired, one adds about 10 to 25% of a 95% alcohol. If a lotion is desired, 25 to 50% alcohol is added. Expressed in another way, a ratio of three parts by weight of emulsion to one part by weight of alcohol gives a satisfactory cream; a ratio of one part by weight of emulsion to three parts by weight of alcohol gives a satisfactory lotion.

If desired, a small quantity of a suitable antiseptic may be added to the emulsion for example, hexachlorophene, 2,2'-thio-bis-(4,6-dichlorophenol), or 3,4,4'-trichlorocarbonilide to obtain a continuous germicidal effect on the skin following application.

As examples of some emulsion compositions that may be prepared in accordance with this invention, the following may be cited, although obviously many more formulae of the type contemplated may easily be devised by application of the general principles involved.

*Example I*

33 grams of starch are wetted with a small volume of ethyl alcohol and added to a previously mixed composition of 0.5 grams triethanolamine and 5.0 grams stearic acid. 47 grams of distilled water are added slowly until a homogenous emulsion results. A sufficient quantity, to make a total volume of 11 cc., of ethyl alcohol is admixed until a smooth cream-like consistency has been effected.

*Example II*

| | Percent |
|---|---|
| Distilled water | 12.0 |
| Carboxyvinyl polymer in free acid form | 0.4 |
| Polyoxyethylenecocoamine | 1.5 |
| Starch | 38.1 |
| Ethyl alcohol | 48.0 |
| | 100.0 |

The above ingredients are formulated as follows: The water is heated to a temperature of 70° C. The carboxyvinyl polymer is slowly sprinkled into the heated water and the mixture is stirred until no lumps exist. It is allowed to stand about twenty minutes for air bubbles to rise. The polyoxyethylenecocoamine is then added slowly with stirring. In a separate container a sufficient volume of alcohol is mixed with the starch to make a thin paste. The remaining amount of starch is then added to the mixture and mixed. The starch-alcohol mixture is then added to the carboxyvinyl polymer-polyoxyethylenecocoamine emulsion with continuous stirring. A cream of smooth consistency is formed after thorough mixing.

*Example III*

| | Percent |
|---|---|
| Distilled water | 12.0 |
| Carboxyvinyl polymer in free acid form | 0.4 |
| Polyoxyethylenecocoamine | 1.5 |
| Starch | 38.1 |
| Isopropyl alcohol | 48.0 |
| | 100.0 |

The above ingredients are formulated as follows: The water is heated to a temperature of 70° C. The carboxyvinyl polymer is slowly sprinkled into the heated water and the mixture is stirred until no lumps exist. It is allowed to stand about twenty minutes for air bubbles to rise. The polyoxyethylenecocoamine is then added slowly with stirring. In a separate container a sufficient volume of alcohol is mixed with the starch to make a thin paste. The remaining amount of starch is then added to the mixture and mixed. The starch-alcohol mixture is then added to the carboxyvinyl polymer-polyoxyethylenecocoamine emulsion with continuous stirring. A cream of smooth consistency is formed after thorough mixing.

This cream may be sterilized by conventional methods such as autoclaving, irradiation, or the addition of epoxides such as ethylene oxide or propylene oxide in a concentration of 1% to the finished cream.

What is claimed is:

1. A surgical lubricating cream consisting essentially of a lubricating powder of the group consisting of starch and lycopodium intimately admixed with a hydroalcoholic solvent containing at least 10% lower alkanol, said lubricating powder and hydroalcoholic solvent being uniformly distributed throughout an emulsion vehicle.

2. A composition as set forth in claim 1 wherein the lower alkanol is ethyl alcohol.

3. A composition as set forth in claim 1 wherein the lower alkanol is isopropyl alcohol.

4. A surgical lubricating cream consisting essentially of starch suspended in a hydroalcoholic solvent containing at least 10% lower alkanol, said starch and hydroalcoholic solvent being uniformly distributed throughout an emulsion vehicle.

5. A surgical lubricating cream consisting essentially of formaldehyde-treated starch in a hydroalcoholic solvent containing at least 10% lower alkanol, said starch and hydroalcoholic solvent being uniformly distributed throughout an emulsion vehicle.

6. A surgical lubricating cream consisting essentially of epichlorhydrin-treated starch in a hydroalcoholic solvent containing at least 10% lower alkanol, said starch and hydroalcoholic solvent being uniformly distributed throughout an emulsion vehicle.

7. A surgical lubricating cream consisting essentially of formaldehyde-treated starch in a hydroalcoholic solvent containing at least 10% lower alkanol and carboxyvinyl polymer neutralized with polyoxyethylenecocoamine.

8. A surgical lubricating cream consisting essentially of epichlorhydrin-treated starch in a hydroalcoholic solvent contains at least 10% lower alkanol and carboxyvinyl polymer neutralized with polyoxyethylenecocoamine.

9. A surgical lubricating cream consisting essentially of starch and a hydroalcoholic solvent containing at least 10% lower alkanol and stearic acid emulsified with triethanolamine.

References Cited in the file of this patent

UNITED STATES PATENTS

| | | |
|---|---|---|
| 2,400,402 | Evans | May 14, 1946 |
| 2,469,957 | Fenn | May 10, 1949 |
| 2,613,206 | Caldwell | Oct. 7, 1952 |
| 2,626,257 | Caldwell | Jan. 20, 1953 |
| 2,935,408 | Steinitz | May 3, 1960 |

OTHER REFERENCES

Carbopol 934, I, 24 p. booklet by B.F. Goodrich Chem. Co., Cleveland, Ohio (1957), pages 2, 7, 8, 11, 12, 16 and 19.

Carbopol II, Supplement No. 1, March 1959, to Carbopol 934 booklet, 4 pages.